No. 841,968. PATENTED JAN. 22, 1907.
F. HITCHCOCK.
VEHICLE TIRE.
APPLICATION FILED MAR. 3, 1906.
2 SHEETS—SHEET 1.
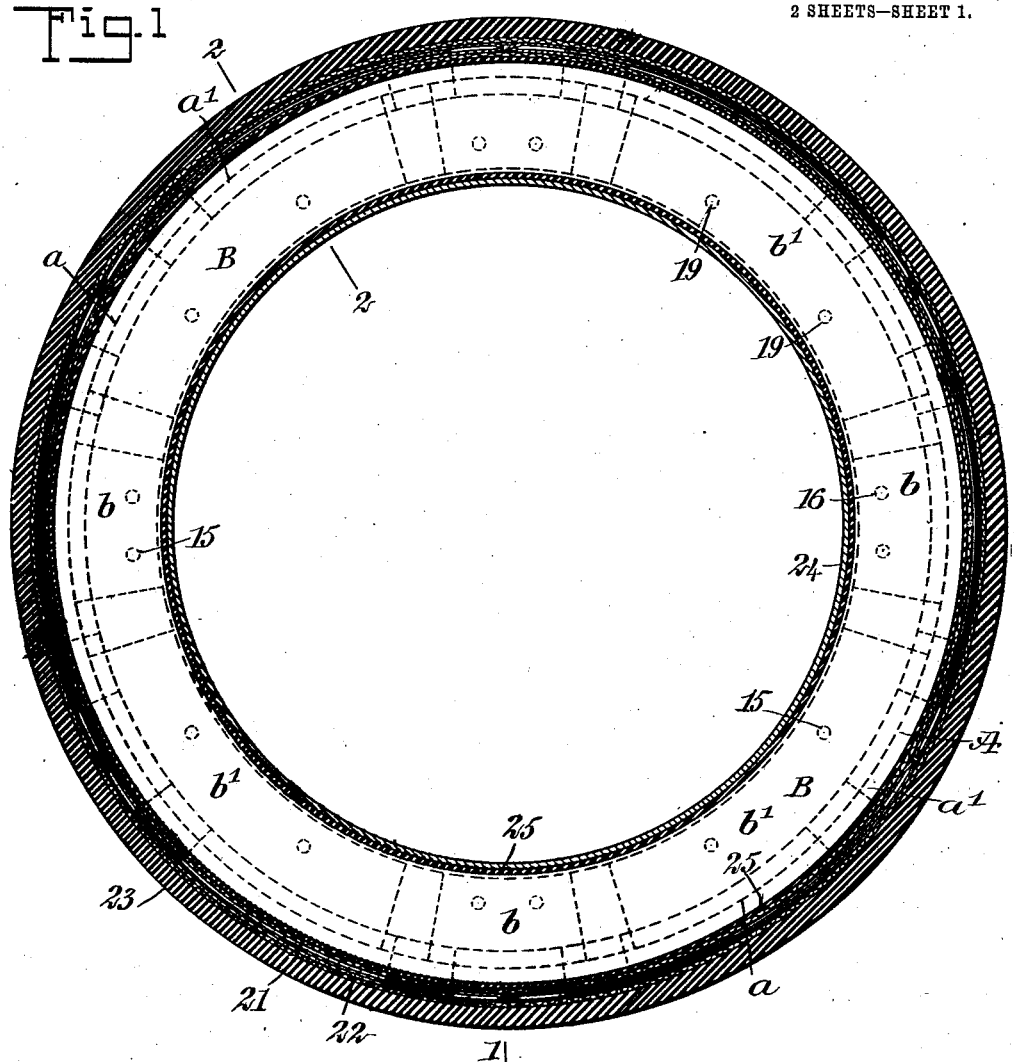
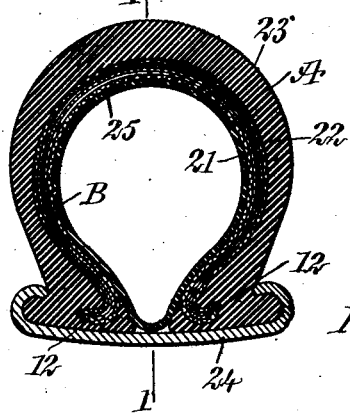
WITNESSES:
INVENTOR
Fred Hitchcock
BY Munn & Co.
ATTORNEYS No. 841,968. PATENTED JAN. 22, 1907.
F. HITCHCOCK.
VEHICLE TIRE.
APPLICATION FILED MAR. 3, 1906.
2 SHEETS—SHEET 2.
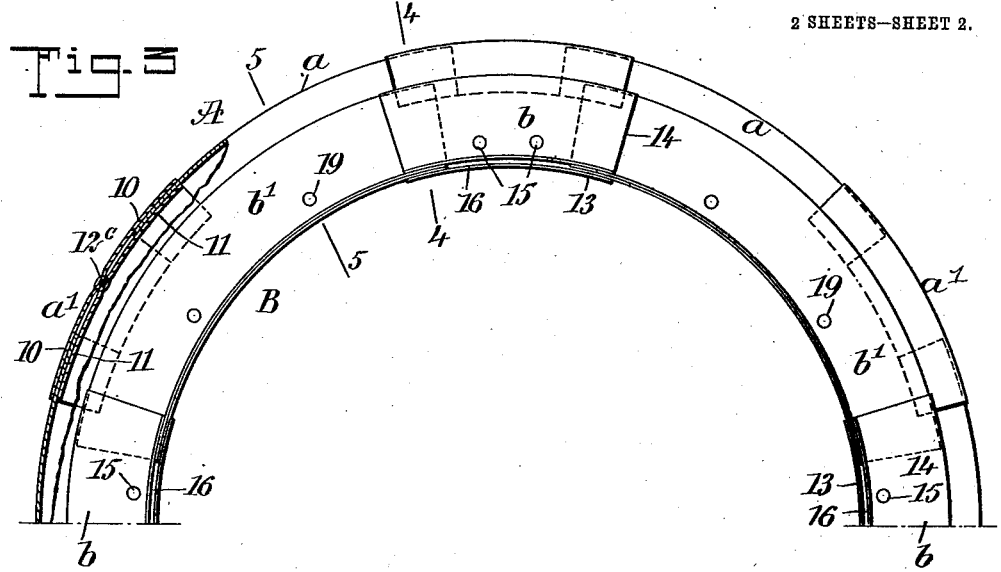
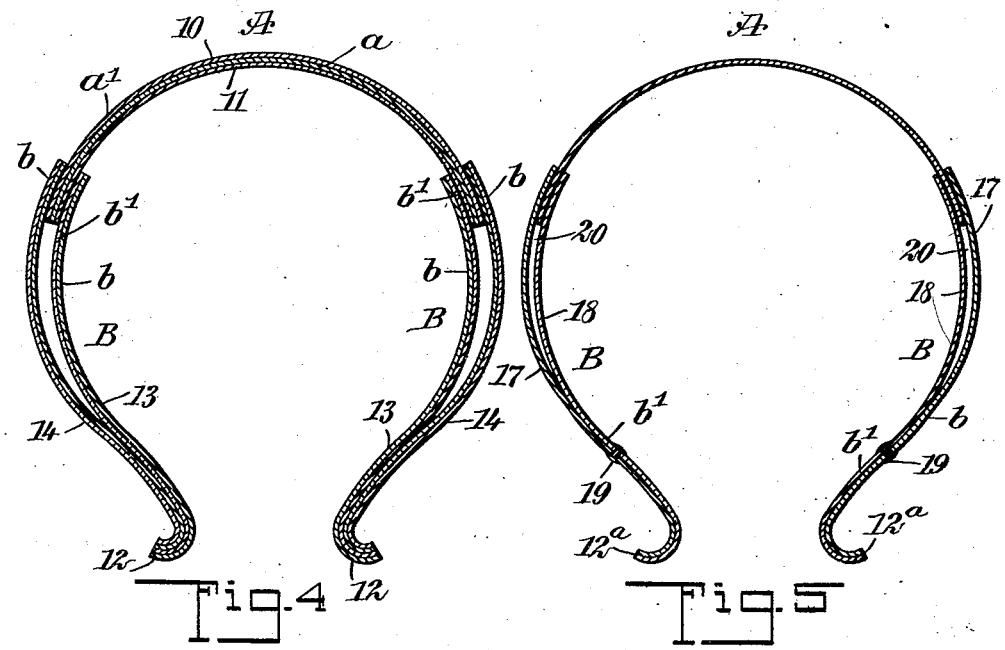
WITNESSES:
INVENTOR
Fred Hitchcock
BY
ATTORNEYS

UNITED STATES PATENT OFFICE.

FRED HITCHCOCK, OF FREEPORT, NEW YORK, ASSIGNOR OF ONE-HALF TO FRANK H. STEVENS, OF FREEPORT, NEW YORK.

VEHICLE-TIRE.

No. 841,968.          Specification of Letters Patent.          Patented Jan. 22, 1907.

Application filed March 3, 1906. Serial No. 304,070.

*To all whom it may concern:*

Be it known that I, FRED HITCHCOCK, a citizen of the United States, and a resident of Freeport, in the county of Nassau and State of New York, have invented a new and useful Improvement in Vehicle-Tires, of which the following is a full, clear, and exact description.

The purpose of the invention is to provide an armor for use in connection with the shoe of an automobile or other vehicle tire and a protection for the inner tube, rendering the tire punctureless, and to so construct and apply the armor that it will not detract from the usual elasticity of such tires.

A further purpose of the invention is to construct such armor in such manner that it will be light yet strong and so that it will have more or less yielding action circumferentially of the wheel and so that a shoe provided with the improved lining or armor can receive the inner tube and can be applied to the rim of the wheel as conveniently and as securely as the ordinary shoe.

Another purpose of the invention is to provide a protective armor for the inner tube of inflated tires which is capable of use directly as a shoe.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a vertical section through the rim of a wheel and the improved tire, the section being taken practically on the line 1 1 of Fig. 2. Fig. 2 is a transverse section taken substantially on the line 2 2 of Fig. 1. Fig. 3 is a sectional side elevation of one-half of the improved armor. Fig. 4 is a transverse section through the armor, taken practically on the line 4 4 of Fig. 3 and drawn upon an enlarged scale; and Fig. 5 is a similar section taken practically on the line 5 5 of Fig. 3.

The armor is constructed of three sections—a tread-section A and two side sections B of like formation. The sections are made, preferably, of steel, as thin as possible consistent with strength, or may be made of metal of any kind and of any suitable thickness. The tread-section A consists of alternately-arranged members $a$ and $a'$, segmental in transverse section, as is shown in Figs. 4 and 5. The members $a$ are in one piece of material, and the members $a'$ are constructed of two pieces of material 10 and 11, placed one over the other and connected at their central portions by rivets $12^c$, as is shown in Fig. 3, being separated at their end portions, so as to form pockets for the reception of the end portions of the single members $a$, which are therefore telescopically connected with the double members $a'$. Any desired number of members $a$ and $a'$ are employed in the construction of the tread-section A, and it will be observed that by reason of the telescopic connections between the said members $a$ and $a'$ more or less resiliency is imparted to said tread-section in operation, so that this portion of the armor will not tend to deaden the shoe to which it is applied. The movement of the members $a$ and $a'$ relatively to each other is necessarily limited. The sections B are likewise preferably made up of alternately-arranged members $b$ and $b'$, and the side sections B have substantially telescopic connection with the longitudinal edges of the members $a$ and $a'$ of the tread-section A, and the members $b$ and $b'$ of the side sections B have telescopic connection with each other. In the drawings eight members are provided for each side section B; but I do not limit myself to any particular number. Preferably the members $b$ are made shorter than the members $b'$.

The members $b$ and $b'$ of the side sections B are curved to correspond to the curvature of the shoe to which the armor is to be applied, and in connection with the tread-section A the cross-section of the armor closely approaches a circle, as the side sections, while converging at the bottom of the armor, are yet spaced apart. In the construction of a member $b$ two opposing plates 13 and 14 are employed—an inner and an upper plate. These plates are of the same shape, and their lower ends are given an outward and slightly upward curvature, as shown at 12 in Fig. 4. The plates 13 and 14 of each member $b$ are connected and yet held spaced apart by rivets 15, (shown best in Fig. 3,) whereby a pocket 16 is obtained in each of the members $b$ entirely unobstructed at the ends of the members, as the rivets or bolts 15 are located one at each side of the center. The pockets at the ends of the membrs $b$ receive the end portions of the members $b'$, and while the pockets in the members $b$ are quite wide at their upper portions they are made to gradually diminish in width as they approach the lower ends of the said members, as is clearly shown in Fig. 4. With regard to the members $b'$ they each consist of an inner plate 18 and an outer plate 17, and these plates 17 and 18 are secured together by rivets 19 at a point between their centers and their lower ends, as is shown in Fig. 5, so that from a point above the rivets and from the rivets to the lower end portions $12^a$ of the said members $b'$ the said plates lie in close contact with each other, and the curvature of the lower portions $12^a$ and the said members $b'$ corresponds to the curvature of the lower ends 12 of the members $b$, as is shown in Fig. 4. The upper portions of the plates 17 and 18, composing the members $b'$, are separated to form pockets 20; but the separation is not necessarily so great as is the separation of the plates 13 and 14 of the members $b$, since the pockets 16 in the members $b$ receive the end portions of the members $b'$, together with the lower edges of the members of the tread-section A, as is shown in Figs. 4 and 5.

Before applying the shoe 23 to the armor just described the inner face of the armor is provided with a cover 21, of canvas or a like material, and the outer face of the armor is provided with a similar covering 22, as is shown in Figs. 1 and 2, and then the shoe 23, which may be of any suitable shape to be fitted to the rim 24, is vulcanized or otherwise secured upon the outer face of the said armor, the bottom edges 12 and $12^a$ of the said armor being embedded in the said shoe.

If desired, the armor may be made a shoe of itself—for example, by lining the inner portion of the armor with thin leather and after covering the outer portion of the armor with canvas again covering it with heavy leather. Under some conditions a tire thus constructed is as well adapted for service as a tire having the customary shoe applied.

Having thus described my invention, I claim as new and desire to secure by Letters Patent—

1. In vehicle-tires, an armor composed of a plurality of series of telescopically-connected members, the series lying alongside of each other, and each member of each series being telescopically connected with the adjacent members of the adjacent series.

2. In a vehicle-tire, an armor consisting of a tread-section and side sections engaging with the tread-section, the side sections being made to converge at their lower portions and to have their lower edges upwardly and outwardly inclined.

3. In a vehicle-tire, an armor consisting of a continuous tread-section constructed of telescopically-connected members, and side sections telescopically connected with each other and with the members of the tread-section.

4. In vehicle-tires, a continuous tread-section constructed of members having telescopic connection with each other, and side sections the members whereof have telescopic connection with each other and telescopic and slidable connection with the members of the tread-section.

5. In vehicle-tires, a continuous tread-section constructed of members having telescopic connection with each other, and side sections the members whereof have telescopic connection with each other and telescopic and slidable connection with the members of the tread-section, the side sections having their lower portions curved inward in direction of each other and their lower edges curved outward or away from each other.

6. In a vehicle-tire, an armor for the inner tube thereof, consisting of a tread-section the members whereof have sliding relation to each other, side sections the members whereof have slidable relation to each other and to the tread-section, a covering for the inner and the outer faces of the said armor, and a shoe fitted to the outer contour of the armor.

In testimony whereof I have signed my name to this specification in the presence of two subscribing witnesses.

FRED. HITCHCOCK.

Witnesses:
HARRY G. CLARK,
GEORGE WALLACE.